March 10, 1970     D. E. CZERNIK ET AL     3,499,655

ELASTOMERIC GROMMET FOR GASKETS

Filed Dec. 30, 1966     3 Sheets-Sheet 1

Inventors
Marion H. Kapps and
Daniel E. Czernik
By George H. Simmons
Atty

Inventors
Marion H. Kapps and
Daniel E. Czernik
By George H. Simmons Atty

March 10, 1970  D. E. CZERNIK ET AL  3,499,655
ELASTOMERIC GROMMET FOR GASKETS

Filed Dec. 30, 1966  3 Sheets-Sheet 3

CYLINDER HEAD

ENGINE BLOCK

Inventors
Marion H. Kapps and
Daniel E. Czernik
By George H. Simmons
Att'y.

United States Patent Office 3,499,655
Patented Mar. 10, 1970

3,499,655
ELASTOMERIC GROMMET FOR GASKETS
Daniel E. Czernik, Hinsdale, and Marion H. Kapps, Elmhurst, Ill., assignors to Victor Manufacturing & Gasket Company, Chicago, Ill., a corporation of Illinois
Filed Dec. 30, 1966, Ser. No. 606,399
Int. Cl. F16j 15/10
U.S. Cl. 277—235      7 Claims

ABSTRACT OF THE DISCLOSURE

This application discloses an elastomeric grommet for insertion in cylinder head gaskets and the like and also discloses data derived from engineering tests which data enables the design of grommets to meet rigid specifications in an efficient and economical manner.

---

It is a main object of the invention to provide a grommet composed of an elastomeric material bonded to a metal carrier plate and shaped to meet specified requirements in an efficient manner.

Another object of the invention is to provide a grommet composed of an elastomeric material bonded to a metal carrier plate and having sealing faces on its upper and lower ends and having a compression zone extending through the grommet between said faces.

Another object of the invention is to provide a grommet body having within it a compression zone, which body is bonded to a carrier plate, the inner edge of which lies outside of said compression zone.

Another object of the invention is to provide a grommet body composed of an elastomeric material and shaped to enable the body to be compressed from a free state height to a specified working thickness without rupture of the body.

Further objects of the invention not specifically mentioned here will be apparent from the detailed description and claims which follow, reference being had to the accompanying drawings in which a preferred embodiment of the invention is shown by way of example and in which:

Figure 1:
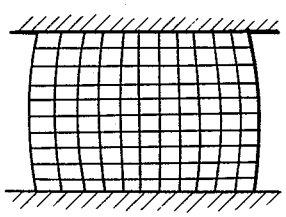
FIG. 1 is an end elevational view of a test sample of square cross section compressed to 15% compression.

Cylinder head gaskets are commonly clamped between the head and block of an internal combustion engine to form a seal between these members. Such gaskets frequently are equipped with fire rings which surround the combustion chamber openings of the engine and block and with grommets composed either of metal or an elastomeric material for sealing channels that extend between the head and block and carry lubricants and coolants therebetween.

Engine manufacturers specify the torque to be applied to the bolts or studs through which the clamping of the head and of the block is to be accomplished. From the thus specified values of torque the total force available to clamp the gasket between the head and block can be calculated. Such specifications also usually include the range of working thickness to which the gasket is to be compressed.

The total force available for clamping the head upon the block with the gasket therebetween must be distributed throughout the gasket according to need. Since the pressures in the combustion chamber are high, a substantial share of this force, frequently from 30% to 50% must be utilized to compress the fire ring sufficiently to seal the gases in the combustion chamber. The remaining 50% to 70% of the available force must be distributed over the remainder of the gasket to compress the grommets therein and the body thereof sufficiently to seal the fluid channels. It has been found that a better distribution of the available force can be achieved through the use of grommets composed of an elastomeric material, and it is to grommets of this type that the present invention applies.

Elastomeric materials cannot be compressed, but rather when subjected to a compressive force, such materials are displaced mainly at right angles to the direction of application of the force. The amount of displacement of such materials responsive to the application of a particular force thereto is dependent upon a number of factors. The composition of the elastomer is an important factor. Equally important is the cross-sectional shape of the grommet and in cases where the grommet is bonded to a carrier member, usually metal, the degree of penetration of the metal into the body of the grommet is an important factor. It is also known that a grommet composed of a particular material and having a particular shape can be compressed only a definite amount, expressed as a percentage of compression, before rupture.

The amount of displacement of elastomeric material produced by a given compressive force applied thereto varies with the amount of material to be displaced. The greater the amount of material to be displaced the greater the force required to produce a desired percentage of compression of the grommet. Hence, it follows that grommets having the shapes which require displacement of a large amount of material will require the application of a greater portion of the available force to compress the grommet to a specified working thickness than will a grommet the shape of which requires displacement of a smaller volume of material.

In order to facilitate designing gaskets and the grommets contained therein in an economical and efficient manner, we have run laboratory tests of various grommets composed of various elastomeric materials and having various shapes and various degrees of penetration of supporting members into the elastomeric material. The data collected in these tests has been found to be useful in designing grommets capable of meeting engine manufacturers specifications in a satisfactory manner.

Figure 6:
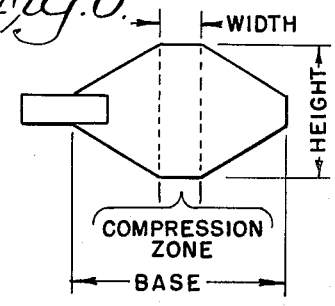
FIG. 6 is a diagrammatic view of a grommet illustrating the terminology used herein.

The invention will be best understood by reference to the accompanying drawings in which we have illustrated selected test samples and have noted the load compression data of these samples. As used herein, the term base or base line is applied to the horizontal median line of the grommet, the term height is applied to the distance between the upper and lower surfaces which engage the head and block of an engine, and the term width is applied to the dimension of that engaging surface. Thus in a grommet having a square cross section, the base equals the height and also equals the width. In these grommets that portion of the grommet aligned with the engaging surfaces, indicated in dotted lines in FIG. 6, may be termed the compression zone. In rectangular grommets the entire body is in the compression zone.

Grommets incorporated in production gaskets are quite small, frequently having a base of not more than ⅛ inch, and height varying from one-tenth the dimension of the base upwards to an equal dimension. The width of the engaging surfaces also varies from approximately one-tenth of the dimension of the base up to a dimension equal to the dimension of the base, depending upon the shape of the grommet in cross section.

In order to facilitate better observation of strains within the grommet as compressive forces are applied to it, we have constructed test samples having dimensions twenty times the dimensions of production grommets. These samples have been of various shapes and have had metal inserts projecting therein by varying amounts. In order to facilitate observation of the internal strains, we have marked the ends of these samples with vertical and horizontal parallel lines in color contrasting with the color of the elastomeric material in the sample.

FIGS. 1 through 5 of the drawings are end elevational views of these samples.

By loading the sample with a known number of pounds and then measuring the amount of compression thereof, the load compression data was recorded in the form of a graph. By observing the distortion of the vertical and horizontal lines upon the sample, the strains produced therein were observed and were photographed for future study.

In FIG. 1 we have shown a grommet sample of square cross section loaded to produce a compression of 15%. Curve 10 in the graph shown in FIG. 8 records the load compression data of this sample. It will be observed that approximately 98 pounds of load is required to compress the sample to 15%. From FIG. 1 it will be seen that the strains within the sample produced by this load result from horizontal bulging of the sample, which bulging is greatest midway between the upper and lower surfaces of the sample. It will also be observed that at the horizontal center of the sample the vertical lines show no distortion, and that the distortion throughout the rest of the sample is uniform. This is because the entire body of the sample is in the compression zone.

Figure 2:
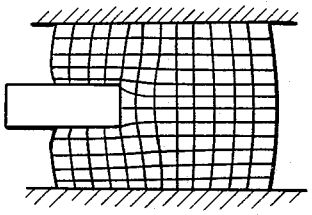
FIG. 2 is an end elevational view of a sample similar to that of FIG. 1 but containing a metal insert and compressed to 15% compression.
Figure 8:
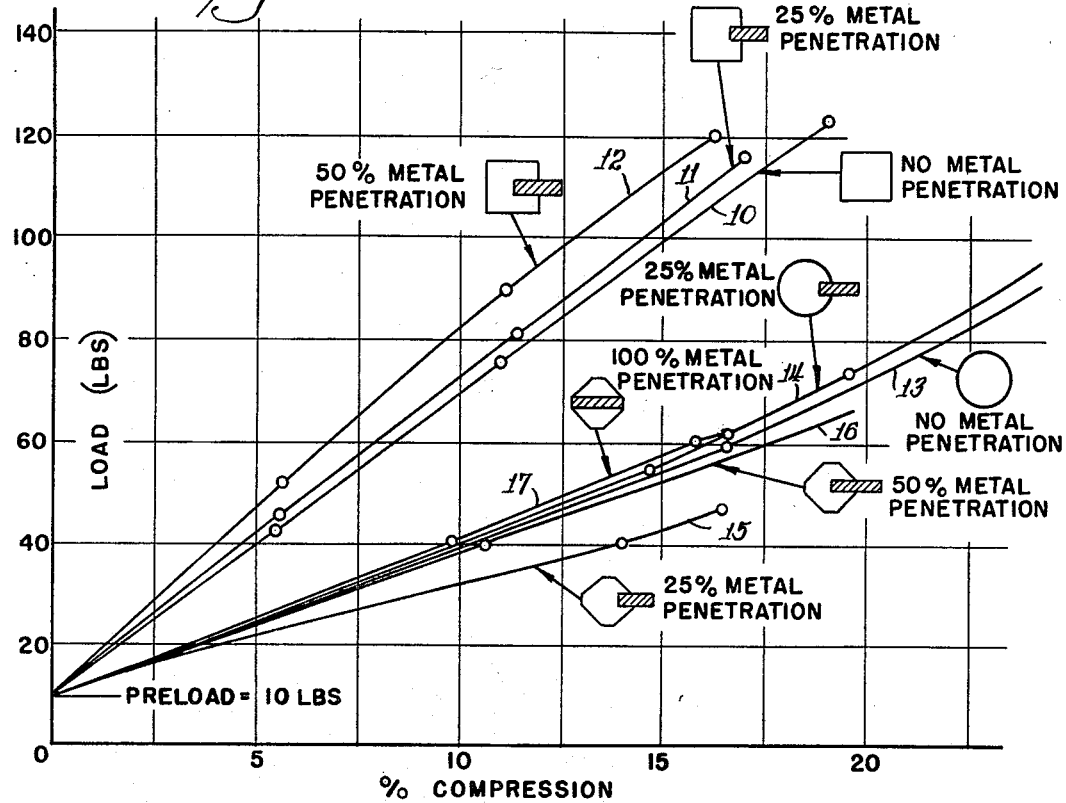
FIG. 8 is a graph showing the load-compression characteristics of various test samples.

In FIG. 2 we have shown a similar sample with a metal carrier member penetrating into the sample approximately one-fourth of the base dimension thereof. Curve 11 in FIG. 8 shows the load compression data of this sample, and it will be observed that approximately 105 pounds of load was required to compress the sample 15%. From FIG. 2 it will be observed that both the vertical and horizontal lines on the end of the sample show distortion produced by strain within the body of the sample. Curve 12 in FIG. 8 shows the load compression data of a similar sample in which the metal carrier penetrates to 50% of the base of the sample. It will be observed that a load of approximately 112 pounds was required to produce a 15% compression of the sample. Since the entire body of a rectangular grommet is in the compression zone, any metal insert that extends but part way through the body terminates within the compression zone and strains in the body are thereby increased.

In FIG. 8 we have also shown the load compression characteristics in curve 13 of a sample of circular cross section and containing no metal insert. It will be observed that approximately 55 pounds of load was required to produce a 15% compression of this sample. Curve 14 shows the load compression ratio of a sample of a circular cross section having a metal carrier penetrating approximately 25% into the body of the sample. It will be observed that a load of approximately 58 pounds was required to compress this sample 15%. As load is applied to a sample of circular cross section, the width of the engagement area increases rapidly, from an initial theoretical geometric line, as compression occurs. This increase of width results in distributing the applied load over an increasingly large area and the load per unit area is correspondingly decreased. Such a decrease is disadvantageous in many instances.

Figure 5:
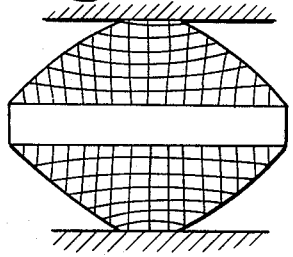
FIG. 5 is an end elevational view of a sample similar to FIG. 3 but having 100% metal penetration.

Tests were run on a large number of samples of various shapes from which tests it was apparent that a trapezoidal configuration of samples possess definite advantages. In FIG. 5 we have shown such a sample in which the metal carrier extends completely through the base thereof. The portion of the sample above the metal carrier will be seen to be trapezoidal in shape as is that portion disposed below the carrier. In samples in which the metal carrier does not extend completely across the base of the sample, two trapezoids of the elastomeric material are disposed with their respective bases engaging and joined to each other.

Figure 3:
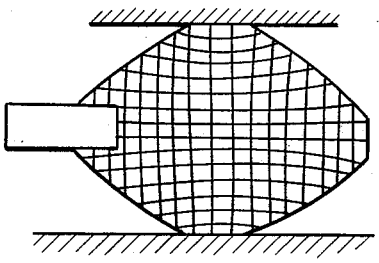
FIG. 3 is an end elevational view of a test sample that is trapezoidal in cross section and contains a metal plate projecting into the body for 25% of the base dimension, which sample is compressed to 15% compression.
Figure 4:
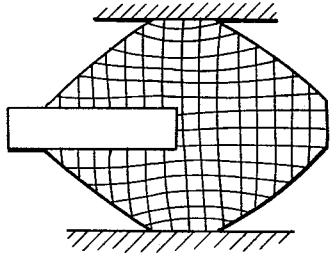
FIG. 4 is an end elevational view of a sample similar to FIG. 3 but having 50% metal plate penetration.

In FIG. 3 we have shown such a sample compressed to 15%, and from curve 15 in FIG. 8 it will be seen that a load of approximately 43 pounds is required to produce 15% compression of the sample. In FIG. 4 we disclose a sample with the carrier metal projecting half-way through the base of the sample. From curve 16 in FIG. 8 it will be seen that a load of approximately 53 pounds is required to produce a 15% compression of the sample. In FIG. 5 the metal member extends completely across the base of the sample, and from curve 17 it will be observed that a load of approximately 57 pounds is required to produce 15% compression of the sample.

The samples shown in FIGS. 3 to 5, in free state have height equal to the base, which height is approximately 5 times the width of the engaging surface. As a result of these proportions the volume of material to be displaced as the sample is compressed is less than that in samples of circular cross-section. The lower loads required to compress the samples 15%, as shown in FIG. 8, verify this conclusion.

From FIG. 3 it will be observed that when the metal insert penetrates into the body of the sample about 25%, a minimum of strain is developed within the sample. This is because the metal terminates outside the compression zone. From FIG. 4 it will be observed that when the metal insert extends approximately 50% into the sample, strains producing both vertical and horizontal distortion of the guide lines are evident. This illustrates the effect produced by terminating the metal in the compression zone. When the metal extends completely across the sample, as shown in FIG. 5, distortion of the guide lines is principally in a horizontal direction. Although this distortion is less than that shown in FIG. 4, it is greater than that shown in FIG. 3.

A study of the results of a large number of tests lead to the conclusion that minimum internal strains in the sample and hence in grommets occurs when the metal carrier to which the elastomeric material is bonded penetrates the body of material only sufficiently to secure a serviceable bond and terminates outside the compression zone. It is also concluded that when the penetration of metal is such that the metal terminates in the compression zone, maximum strain distortion results. Hence, either a 25% penetration of the metal or a 100% penetration thereof is preferable to a 50% penetration since with 50% penetration the inner edge of the metal lies in the compression zone.

Figure 7:
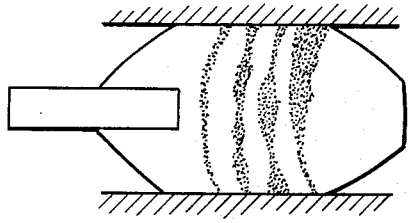
FIG. 7 is an end elevational view of a grommet sample of the type shown in FIG. 3 compressed to the point of rupture.

A number of tests were run by loading the sample to the point of rupture of the elastomeric material. In FIG. 7 we have shown a sample of the type shown in FIG. 3 compressed to the point of rupture of the elastomeric material. It will be observed that the width of the area of engagement has increased to such an extent that the metal insert terminates at the edge of the compression zone. As a result of these tests it was determined that a grommet of square cross section and having metal penetration of approximately 50% cannot be safely loaded beyond 15% compression. A lesser penetration of the metal does not very materially increase the percentage of compression that can be used with safety. With the trapezoidal configuration of the grommet, and a 25% penetration of the metal therein, compression up to 30% can be obtained with safety. In a grommet of trapezoidal configuration having a 100% penetration of metal, a maximum of 25% compression can be obtained with safety. Such a grommet with 50% penetration of metal cannot be safely loaded beyond 20% compression.

Although numerous tests were run with various compositions of elastomeric material, polychloroprene and silicone rubber are the preferred materials for use in grommets of this kind. Also the trapezoidal configuration with a metal penetration of not more than 25% is preferred. Further, it is preferred that the height of the trapezoidal grommet fall in the range of not less than 35% of the base nor more than 75% of the base. The particular height used in a particular instance will depend upon the amount of compression of the grommet necessary to bring it down to a specified working thickness. So long as the amount of compression does not exceed the maximum allowable percentage of compression, satisfactory results can be expected. By keeping the width of the compression zone and sealing faces as small as possible, force applied to the grommet is confined to a small area with consequent high loading per unit area. However, if these widths are too small in a grommet of height approaching the dimension of the base, buckling of the grommet may occur as compressive force is applied. For this reason widths of from one-tenth to one-half the height of the grommet are advisable.

Figure 9:
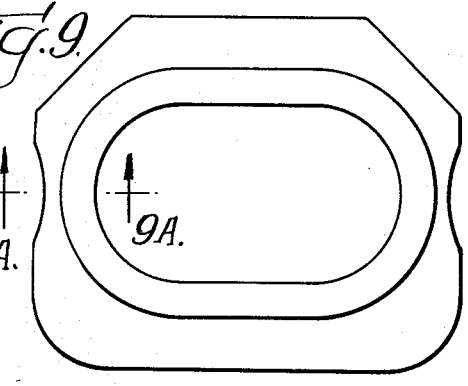
FIG. 9 is a plan view of a production grommet and its carrier plate.

To check the accuracy of the conclusions resulting from these tests, further tests were run upon actual production grommets. In FIG. 9 we have shown such a grommet which from FIG. 9A will be seen to be of rectangular cross section and having a height of 60% of the width of the engaging area.

Figure 10:
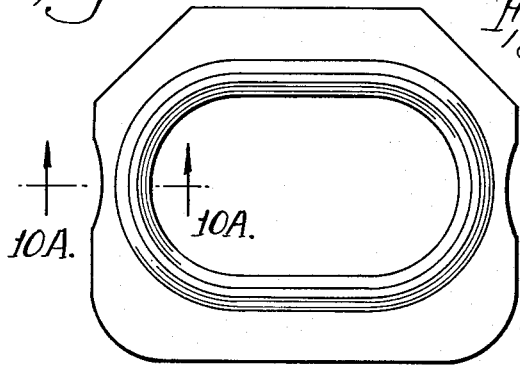
FIG. 10 is a plan view of a preferred form of production grommet.
Figure 10A:
FIG. 10A is a cross sectional view taken along the line 10A—10A of FIG. 10.
Figure 9A:
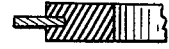
FIG. 9A is a cross sectional view taken along the line 9A—9A of FIG. 9.
Figure 11:
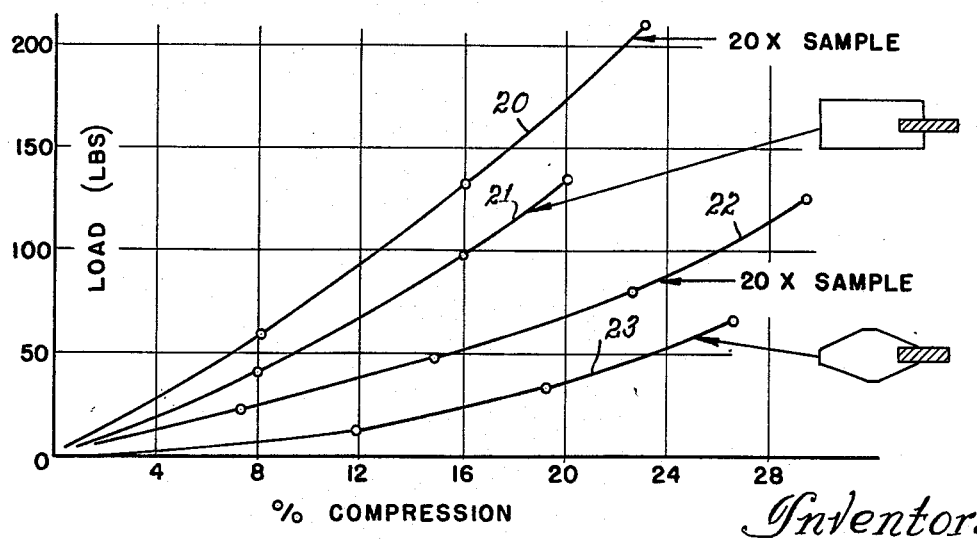
FIG. 11 is a graph showing the load-compression characteristics of test samples and of the production grommets shown in FIGS. 9 and 10.
Figure 12:
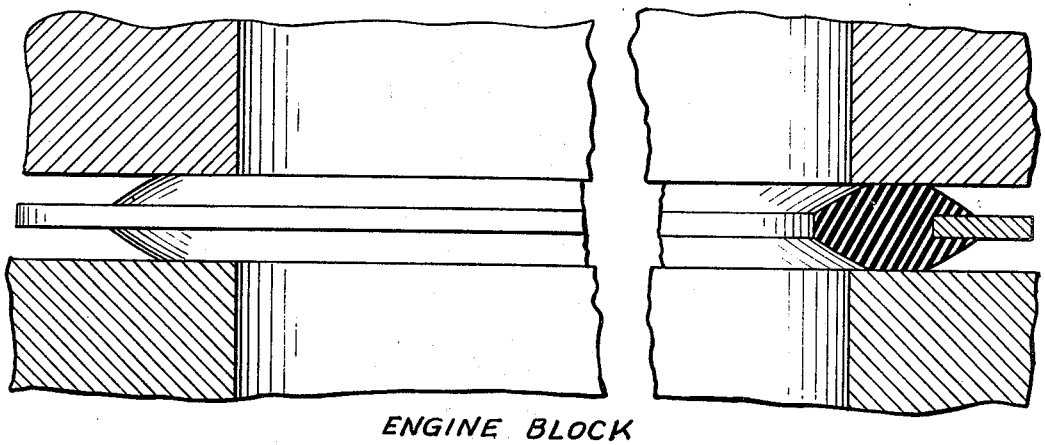
FIG. 12 is a fragmentary view, partly in section at an enlarged scale, showing the production grommet in FIG. 10 disposed between a cylinder head and engine block and sealing a fluid passage extending therebetween.

In FIG. 11 curve 20 represents the load compression characteristics of a sample having dimensions proportional to the grommet shown in FIG. 9A. Curve 21 shows the same data from tests run upon an actual production grommet. In FIG. 10 we show a production grommet which from FIG. 10A will be seen to have a trapezoidal cross section and have a metal penetration of 25%. The grommet shown has a base of .130 inch, a height of .065 inch and a width of .020 inch and is composed of polychloroprene. In FIG. 11 curve 22 shows the load compression characteristics of a sample and curve 23 shows these characteristics for an actual production grommet. Although both curves 20 and 22 show that the samples required a higher loading to produce a given percentage of compression than did the actual production grommets shown in curves 21 and 23, the shapes of the curves are sufficiently similar to render the data derived from the samples an aid in designing production grommets.

It will be noted from curve 23 that a load of approximately 25 pounds is all that is required to produce a 16% compression of the grommets shown in FIGS. 10 and 10A. There are instances where the grommets for sealing certain channels are located outside of the outermost row of bolts by which the head of the engine is clamped onto the block. In the Aukers Patent No. 2,681,241 this condition exists and the grommets located in this area were bonded to a common plate which is secured between the metal facings of the gasket in this area. Since the pressure to be sealed in the area outside of the bolts is low, the trapezoidal grommet is particularly advantageous since only a small load is required to produce a desired percentage of compression leaving a larger portion of the available load for sealing other fluid passages in the gasket.

Grommets of the type shown in FIG. 3 having a 25% penetration of the carrier plate and a height equal to the base and a compression zone and sealing faces width of one-half of the height, when clamped between the head and block of a test engine, have established and maintained seal throughout the test in a satisfactory manner.

From the foregoing it will be apparent that the preferred grommet shape and construction possesses many advantages over the prior art grommets of which we are aware. The narrow sealing faces and the inclined surfaces between those faces and the base of the grommet reduce the volume of elastomeric material that must be displaced in compressing the grommet from a free state thickness to a specified working thickness. Since the volume of material to be displaced is comparatively small, a comparatively small force is all that is required to produce the desired compression. Since the carrier plate to which the grommet is bonded terminates outside the compression zone, strains in the body of the grommet that tend to induce rupture are minimized and a high percentage of compression can be achieved with safety.

What is claimed is:

1. In an internal combustion engine, a cylinder head and block clamped together wherein the improvement comprises a grommet between said cylinder head and block comprising:
   (a) a body of elastomeric material shaped to conform to the channel to be sealed, which body in cross section is trapezoidal in shape above and below the horizontal base line thereof and has a height of not less than 10% of the dimension of said base line;
   (b) a compression zone within said body of width less than the base of the body which zone terminates in sealing faces on the upper and lower ends of the body contacting said cylinder head and block;
   (c) and a metal carrier plate projecting into said body and terminating, at its inner end, outside of said compression zone completely around the periphery of the elastomeric body to which plate the body is bonded.

2. A grommet as specified in claim 1 in which the height of the body lies in the range of from 10% to 100% of the dimension of the base line of the body.

3. A grommet as specified in claim 1 in which the free state height of the body is selected to permit compressing the body to a specified working thickness within the percentage of compression the material in the body can withstand without rupture.

4. A grommet as specified in claim 1 in which the width of the compression zone and sealing faces is in the range of from one-tenth to one-half of the height of the body.

5. A grommet as specified in claim 1 in which the elastomeric material is from the group consisting of polychloroprene and silicone rubber.

6. A grommet as specified in claim 1 in which the metal carrier plate extends into the body not more than 25% of the dimension of the base line of the body and in which the width of the compression zone is less than said 25% of said dimension.

7. A grommet as specified in claim 1 in which the metal carrier plate extends from end to end of the base line of the body.

(References on following page)

References Cited

UNITED STATES PATENTS

| | | | |
|---|---|---|---|
| 1,919,733 | 7/1933 | Kuenzel | 277—178 XR |
| 2,058,010 | 10/1936 | Fitch. | |
| 2,908,293 | 10/1959 | Johnson. | |
| 2,997,755 | 8/1961 | Olson. | |
| 3,168,321 | 2/1965 | Glicksman | 277—235 XR |
| 3,186,042 | 6/1965 | Daley | 277—235 XR |
| 3,340,774 | 9/1967 | Brenneke | 92—171 |

FOREIGN PATENTS

| | | |
|---|---|---|
| 273,560 | 7/1927 | Great Britain. |
| 1,033,507 | 6/1966 | Great Britain. |

LAVERNE D. GEIGER, Primary Examiner

J. S. MEDNICK, Assistant Examiner

U.S. Cl. X.R.

92—171; 277—178